No. 811,025. PATENTED JAN. 30, 1906.
B. G. BAKER.
THRESHING MACHINE.
APPLICATION FILED MAY 11, 1903.
5 SHEETS—SHEET 2.
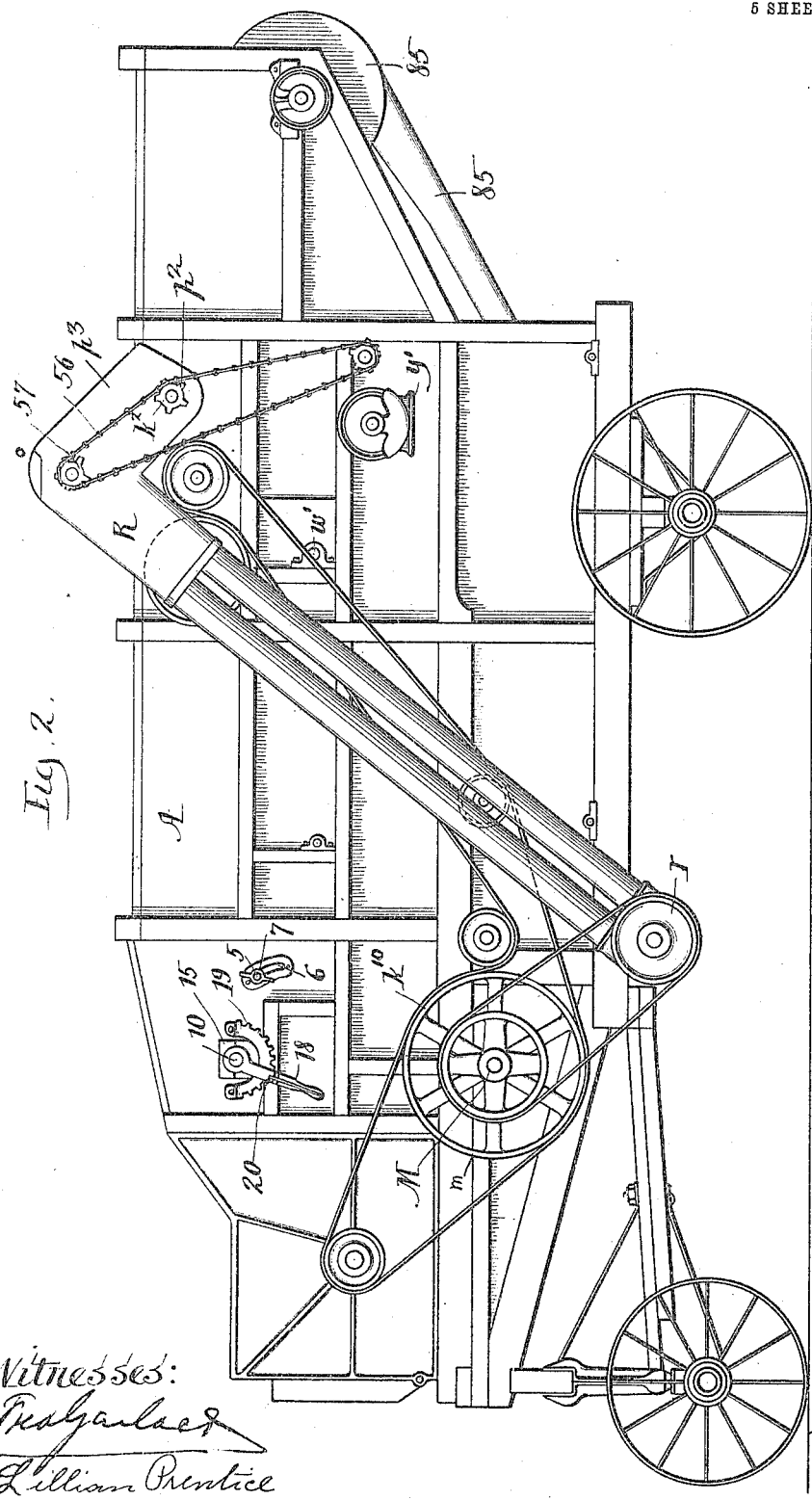

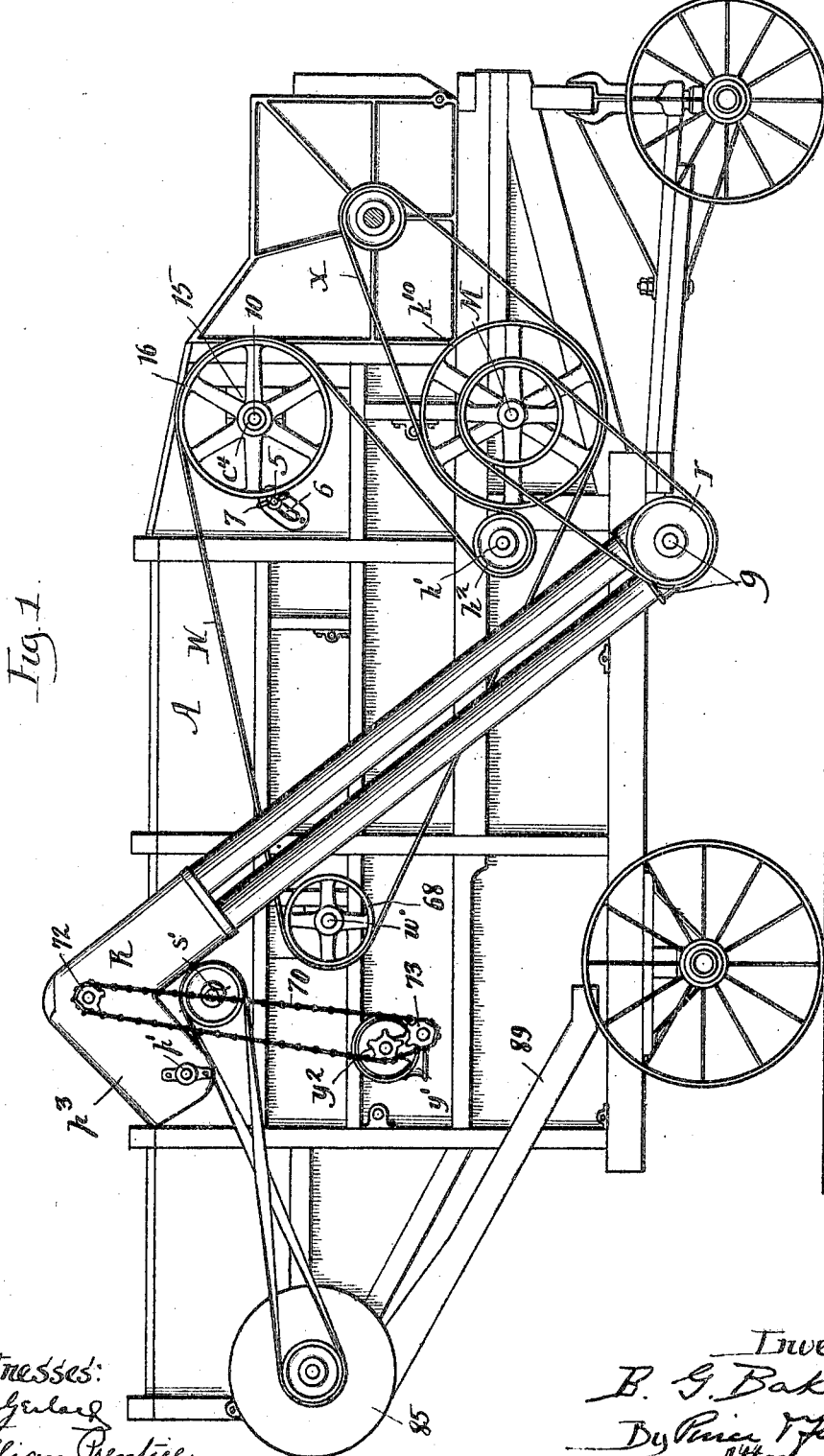

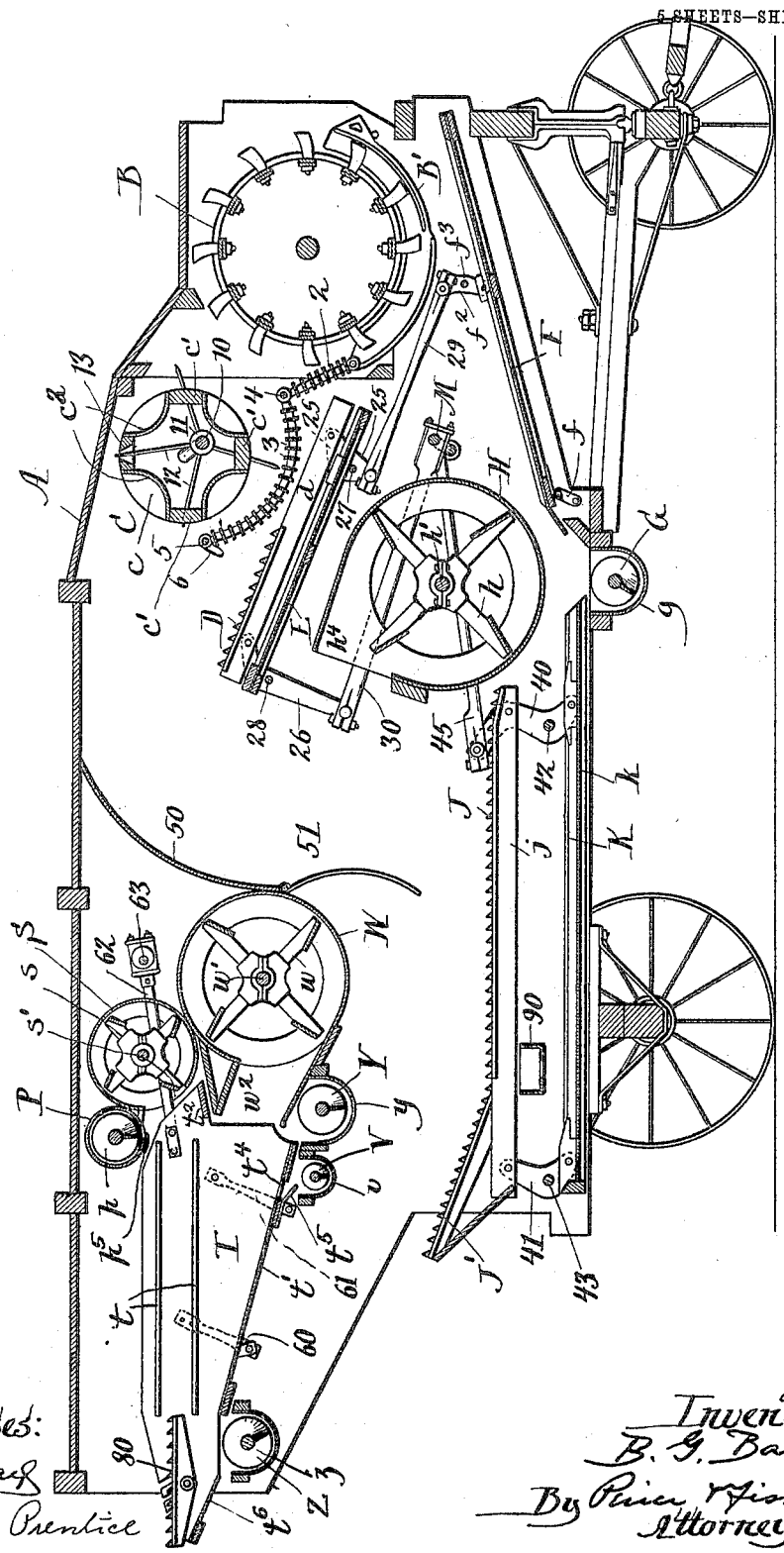

No. 811,025.
PATENTED JAN. 30, 1906.
B. G. BAKER.
THRESHING MACHINE.
APPLICATION FILED MAY 11, 1903.
5 SHEETS—SHEET 4.
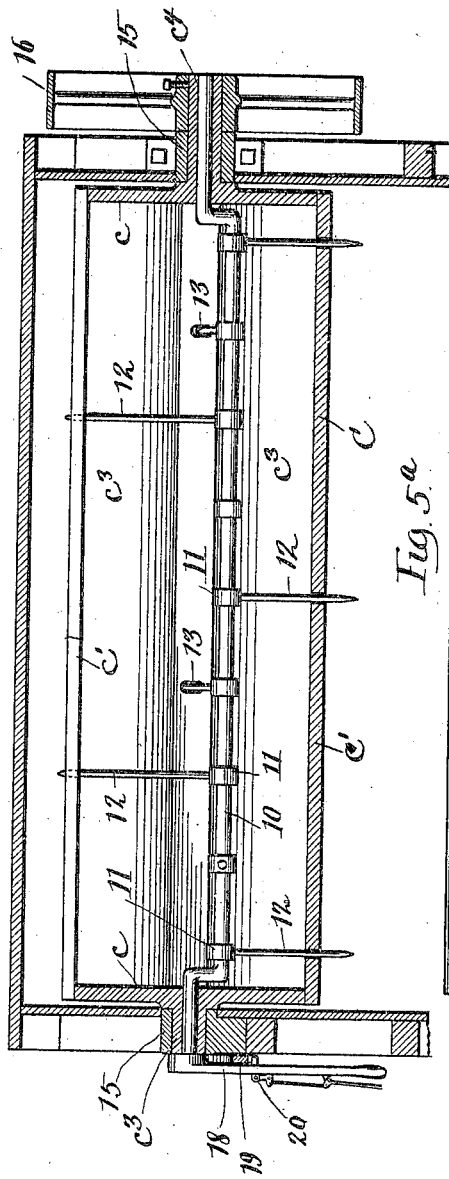
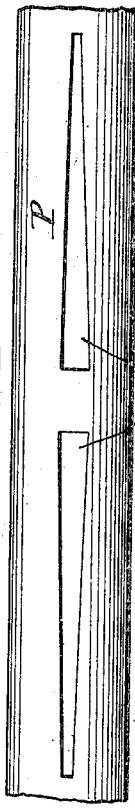
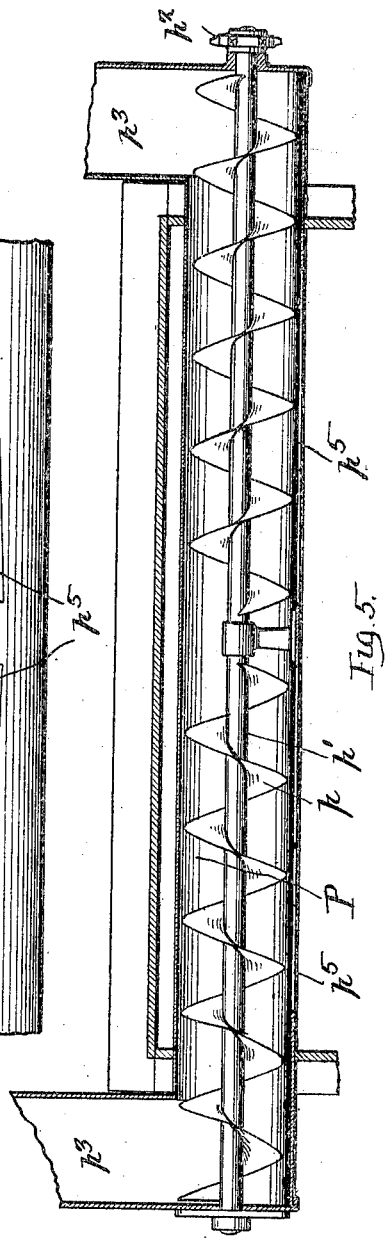
Witnesses:
Fred Gerlach
Lillian Prentice
Inventor
B. G. Baker
By Price & Fisher
Attorneys

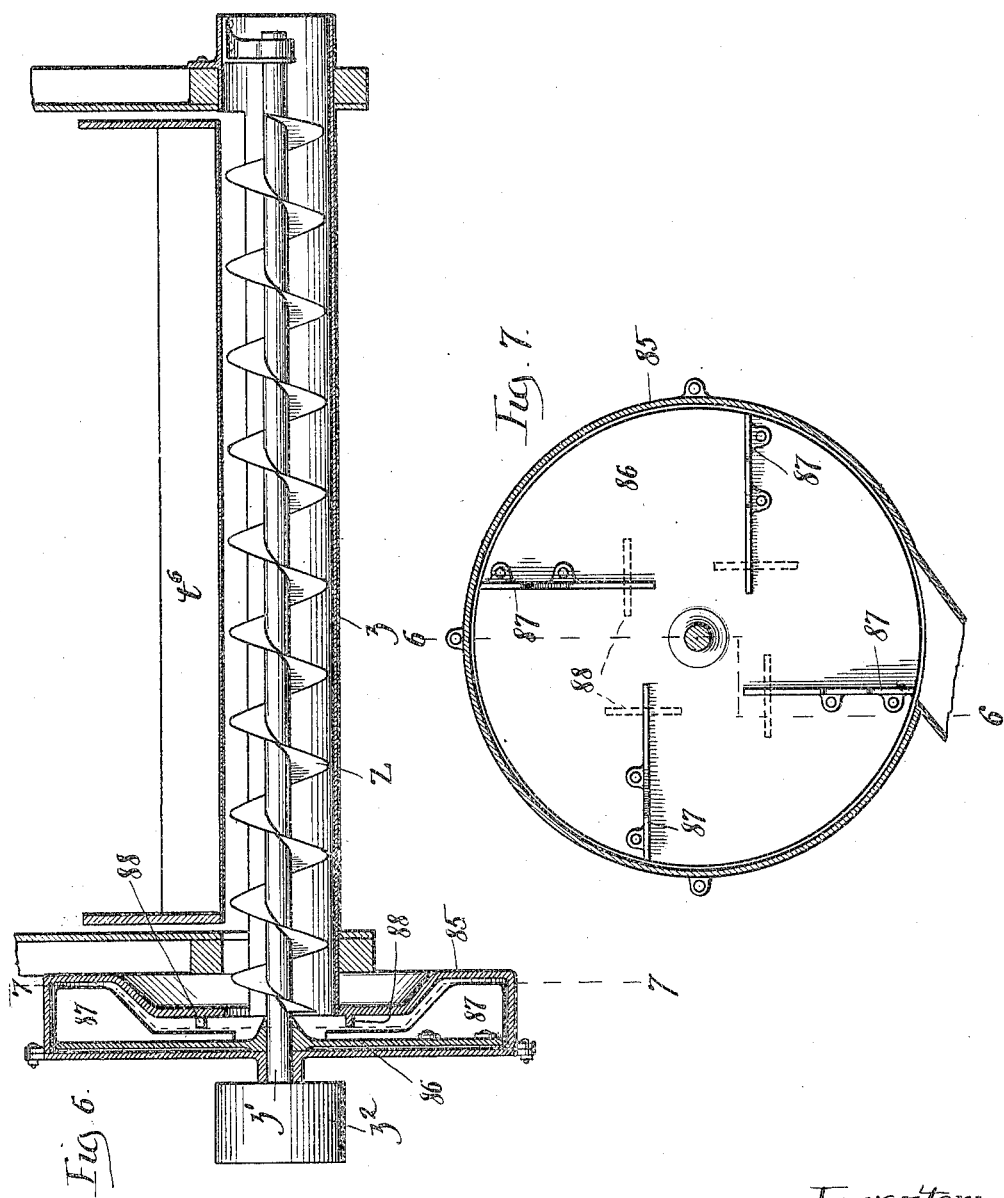

UNITED STATES PATENT OFFICE.

BRYON G. BAKER, OF MINNEAPOLIS, MINNESOTA.

THRESHING-MACHINE.

No. 811,025.  Specification of Letters Patent.  Patented Jan. 30, 1906.

Application filed May 11, 1903. Serial No. 156,509.

*To all whom it may concern:*

Be it known that I, BRYON G. BAKER, a citizen of the United States, residing at Minneapolis, in the county of Hennepin and State of Minnesota, have invented certain new and useful Improvements in Threshing-Machines, of which the following is a full, clear, and exact description, reference being had to the accompanying drawings, forming part of this specification.

This invention has for its object to effect various improvements in threshing-machines, and this object of the invention I have accomplished by the novel features of construction and combinations of parts hereinafter described, illustrated in the accompanying drawings, and particularly defined in the claims at the end of this specification.

Figure 1 is a right-hand view, in side elevation, of a threshing-machine embodying my invention. Fig. 2 is a left-hand side elevation of the machine. Fig. 3 is a view in central longitudinal section from front to rear of the machine. Fig. 4 is an enlarged detail view, in longitudinal section, through the beater mechanism and its supports. Fig. 5 is a view in longitudinal section through the drum or casing into which the grain is elevated from the lower part of the machine. Fig. 5$^a$ is a detail bottom view of the drum or casing shown in Fig. 5. Fig. 6 is a view in vertical longitudinal section through the tailings-auger at the extreme rear of the machine and through the cleaner-casing at the end of said auger. Fig. 7 is a view in vertical transverse section on lines 7 7 of Fig. 6.

In the front of the machine-frame A is mounted the usual threshing-cylinder B, to which the straw to be threshed will be delivered in usual or suitable manner. Beneath the threshing-cylinder B is mounted the usual concave B', and from the rear end of this concave a grate 2 extends upwardly to a curved grate 3, the forward end of which is hung upon a transverse bar 4, extending through the side walls of the main frame of the machine. The rear end of the grate 3 is connected to a rod 5, the ends of which extend through slots 6 in the side walls of the main frame and through slotted plates attached to said side walls. Against these slotted plates will bear the wing-nuts 7 on the threaded ends of the rod 5. The nuts 7 enable the rod 5 to be adjusted so that the grate 3 may be raised or lowered as desired.

Above the grate 3 is mounted my improved beater, (see Figs. 3 and 4,) that comprises a revoluble casing C, through which extends a cranked shaft 10, whereon are loosely mounted the hubs 11 of the beater-fingers 12. As shown, the beater-casing is of irregular outline and is formed with ends $c$, connected by the transverse bars $c'$, extending from end to end of the wings. Between these bars extend the inwardly-curved sheet-metal plates $c^2$. Each of the bars $c'$ is formed with a plurality of conical holes 13, through which the fingers 12 will project. To the ends of the beater-casing are respectively connected the sleeves $c^3$ and $c^4$, that are journaled in suitable bearings 15 of the main frame. To the sleeve $c^4$, that projects outside its bearing 15, is connected the hub of the beater drive-pulley 16, to which revolution is imparted by the main drive-belt W. The sleeves $c^3$ and $c^4$ are formed with concentric holes that receive the ends of the shaft 10, that carries the beater-fingers. One end of the shaft 10 extends outside the sleeve $c^3$ of the beater-casing and has fixed thereto a lever-arm 18, whereby the shaft 10 may be shifted in order to vary the throw of the fingers 12, as will presently more fully appear. Adjacent the lever-arm 18 is formed a segmental rack-bar 19, (see Figs. 2 and 4,) that will be engaged with a grip-trigger 20 on the lever-arm 18, so that the lever-arm 18 can be shifted to and held in different position when desired to adjust the shaft 10 and beater-fingers 12. The purpose in mounting the grate 3 so that it may be vertically adjusted is to enable this grate to be moved nearer to and farther from the path of the beater, and by means of the lever 18 the position of the central portion of the shaft 10 can be correspondingly varied, so that the fingers 12 shall travel in most effective relation to the grate 3 beneath them.

The operation of the beater mechanism will be seen to be as follows, it being understood that revolution is imparted to the pulley 16 in the direction of the arrow, Fig. 1: The straw passing from the concave B' and up the grate 2 is delivered to the curved grate 3 and is caught by the beater-fingers 12 and is thereby carried over and discharged from the rear end of the grate 3. By reference to Figs. 3 and 4 it will be seen that the position of the shaft 10 determines the center of revolution of the beater-fingers 12, that are caused to revolve around the shaft 10 by the beater-casing C, through which these fingers project. It is obvious that by changing the position of the shaft 10 by means of the adjusting-lever 18 the shaft 10 may be moved nearer to or farther from the beater-grate 3 or may be moved forward or backwardly, and consequently the fingers 12 will be caused to travel correspondingly closer to and farther from the grate. This adjustment of the beater-fingers and as well also the adjustment of the grate 3, with which they coöperate, is especially advantageous to better adapt the machine for operation upon different conditions of grain. The beater wings or extensions C' serve to arrest the flying kernels and deflect them down through the straw, while the fingers 12 positively catch and advance the straw and loosen it up. Inasmuch as the shaft 10, that carries the beater-fingers 12, is eccentrically disposed with respect to the beater-casing, it will be seen that as the fingers 12 pass above the rear of the grate 3 they will be approximately covered by the bars c' of the beater-wings. The straw is thus stripped from the fingers and is prevented from winding around the beater-casing. The inwardly-curved plates between the bars c' of the beater materially contributes to the effectiveness thereof, prevents the clogging and winding of the grain around the beater, and yet at the same time allows ample space within the beater for the movement of the beater-fingers.

Beneath the rear portion of the beater-grate 3 extends a short straw-rack D, the rear end of which is inclined in upward direction. The straw-rack D is supported upon side bars d, the ends of which are connected to cranks 25 and 26, that are pivoted upon the transverse rods 27 and 28. The lower ends of the cranks 25 and 26 are connected, respectively, to the pitman-rods 29 and 30, whereby the cranks 25 and 26 are operated in order to impart the swinging movement to the rack D. Beneath the rack D extends a conveyer-pan E, inclined upwardly in rearward direction, and this pan serves to receive the kernels of grain that pass through the grate 3 and rack D and cause the discharge of such grain on the inclined conveyer F, that extends from beneath the concave B' rearwardly and downwardly to the grain-auger G. Hence it will be seen that the kernels of grain separated from the straw by the threshing-cylinder B will pass directly onto the conveyer F, while the grain separated by the beater will pass first onto the supplemental pan or conveyer E and thence onto the conveyer F, whereby it will be delivered into the trough of the grain-auger G.

With threshing-machines as heretofore constructed the straw is carried by a suitable straw rack or racks from the threshing-cylinder to the extreme rear of the machine, where it is dropped onto the stacker-platform or into the hopper of the stacker-fan. By my present invention the straw after it leaves the beater and before it is discharged from the back end of the machine is dropped across the path of an air-blast that serves to effectively aid in separating from the straw such kernels of grain as may be lodged therein, and the grain thus separated is conveyed to the grain-auger. This feature of dropping the straw across the path of an air-blast is preferably accomplished by the mechanism next to be described.

Beneath the upper straw-rack D is mounted the casing H of the fan h, this fan and its casing extending from side to side of the machine and the shaft h' of the fan-casing extending outside the main frame of the machine and being provided with a pulley $h^2$, whereby the fan-shaft will be driven. The mouth $h^4$ of the fan-casing H opens rearwardly, so that the straw falling from the upper rack D must pass directly across the air-blast from the fan-casing H. As the straw thus drops from the upper rack D it will fall onto the lower straw-rack J, the longitudinal bars j of which are mounted upon the upper ends of the rocking levers 40 and 41, that are pivoted to the transverse rods 42 and 43. The lower ends of the rocking levers 40 and 41 are connected to the side bars of the conveyer K, the sheet-metal bottom k of which conveyer extends from the rear end of the straw-rack J to a point above the casing g of the grain-auger G. The rear end of the lower straw-rack J is provided with an upwardly-inclined extension J', over which the straw will pass onto the stacker-platform or into the hopper of the stacker-fan. As shown, the upper arm of the rocking lever 40 is connected by a pitman 45 to the crank-shaft M in front of the fan-casing H, and to this crank-shaft is also connected the forward end of the pitman 30, whereby the movement will be imparted to the upper straw-rack D. Revolution is imparted to the crank-shaft M by a pulley m, fixed to the outer end of this shaft.

It will be understood that when revolution is imparted to the crank-shaft M a swinging movement will be given to the upper straw-rack D and to the lower straw-rack J and conveyer K beneath it, and vertically-swinging movement will also be imparted by the pitman 29 to the front conveyer F, that has its rear end pivotally sustained, as at f, and is connected at its sides to the rock-arms $f^2$, pivoted on the transverse bar $f^3$ and having their upper ends connected to the front end of the pitman 29. Across the main frame at a distance in the rear of the upper straw-rack D extends the shield or plate 50, from the lower end of which is pivotally hung a flap or plate 51, that serves to deflect the straw and matter separated therefrom by the air-blast down onto the lower rack J. The grain, &c., separated from the straw will fall through the rack J onto the bottom plate k of the conveyer K, whence it will pass forwardly into the casing of the auger G. It will thus be seen that a much more effective agitation of the straw and separation of the grain is effected than is possible with those constructions in which the straw is carried directly to the rear of the machine from the beater.

In the upper portion of the rear of the main frame is mounted a transverse drum P, in which is revolubly mounted the auger $p$. This auger $p$ is carried upon a shaft $p'$, and in the preferred form of the invention the auger $p$ is formed of reversely-disposed blades, as shown in Fig. 5, and one end of the shaft $p'$ is extended outside the casing and provided with a sprocket-wheel $p^2$, whereby the auger will be driven. At each end of the drum P is a hopper $p^3$, with which connects the discharge end of the corresponding elevator R. There are preferably two of these elevators R, and their lower ends lead upwardly from the ends of the casing $g$ of the auger G. Each of the elevators R will be provided with a conveyer-chain and flights, and these will be driven by suitable pulleys $r$ at the lower ends of the conveyers. By reference to Fig. 2 of the drawings it will be seen that the auger-shaft $p$ is driven by a sprocket-chain 56, that connects the sprocket-wheel $p^2$ of the shaft $p'$ with a sprocket-wheel 57 on the end of the shaft at the top of the adjacent conveyer R. It will thus be seen that grain, &c., that has been delivered to the casing of the auger G will be carried by the elevators R upward and rearwardly and delivered thereby into the drum P. The drum P has one or more slots or openings $p^5$ in its bottom, and preferably the slots or openings are of varying width, being wider toward the center than at the ends, so as to cause a more uniform distribution of the grain that is delivered to the drum P across the path of an air-blast that will serve to remove the chaff and lighter material from the grain.

In the preferred embodiment of my invention a fan-casing S and fan $s$ are arranged immediately in front of the drum P, and the mouth $s'$ of this fan-casing, which extends from side to side of the machine, serves to direct a blast of air across the volume of grain, &c., falling from the slot $p$ of the drum P. The fan $s$ has its shaft extending outside the main frame and provided with a pulley $s'$, whereby the fan will be driven. Below and to the rear of the drum P extends the shoe T, the upper portion of which is provided with one or more sieves $t$ and the bottom of which is formed of a metal plate $t'$, inclined downwardly toward the front. Transversely of the shoe at its front extends a deflector-plate $t^2$, that inclines downwardly and rearwardly from the mouth of the fan-casing S. In the bottom $t'$ of the shoe is formed a transverse slot $t^4$, extending from side to side of the shoe, and beneath this slot $t^4$ is a deflector-plate $t^5$, that serves to deliver material passing through the slot $t^4$ into the casing $v$ of a screenings-auger V. The shoe T will be supported upon suitable arms 60 and 61 and will have a reciprocating movement imparted thereto by a pitman 62, that will be driven by the shaft 63.

In front of the shoe T is mounted the casing W of a fan $w$, the shaft $w'$ of this fan extending outside the main frame and being furnished with a pulley 68, whereby the fan will be driven. The mouth $w^2$ of the fan-casing opens above the bottom of the shoe and beneath the sieve $t$. Transversely of the front end of the shoe T at its bottom extends the clean grain-auger Y, the casing $y$ of which will terminate in suitable spouts $y'$ outside the main frame of the machine. Preferably the auger Y is a double auger, (similar to that illustrated in Fig. 5,) and at one end the shaft of the auger is provided with a sprocket-wheel $y^2$, to which revolution will be imparted by a chain 70, that passes around a sprocket-wheel 71 at the top of the adjacent elevator R, and preferably a tightener sprocket-wheel 73 will be employed adjacent the sprocket-wheel $y^2$.

From the foregoing description it will be seen that the grain, &c., delivered into the drum P will fall from the slots $p^5$ of the drum across the air-blasts issuing from the fan-casings S and W. The clean and heavy grain will fall directly into the casing of the auger Y, while the lighter material will be carried by the air-blast onto and over the sieves $t$ of the shoe T. The material passing through the sieves $t$ will fall onto the bottom of the shoe $t'$, whence it will pass through the transverse slot $t^4$ into the casing $v$ of the screenings-auger V. The material that passes from the rear end of the upper sieve $t$ will fall onto the extension-rack 80, mounted at the rear of the shoe T. Beneath the rack 80 extends the inclined bottom $t^6$ of the shoe, which serves to convey such material as may fall through the rack 80 down into the trough or casing $z$ of the tailings-auger Z, and into this casing $z$ will also pass any heavy material issuing from the end of the lower sieve $t$. The blast of air from the fan-casing W will serve to carry away dust and like light material, which would otherwise settle upon the sieves and upon the bottom of the shoe.

To one end of the casing $z$ of the tailings-auger Z is connected the casing 85, (see Figs. 1 and 6,) within which is journaled the shaft $z'$ of the auger Z. The outer end of shaft $z'$ has fixed thereto a pulley $z^2$, whereby the shaft is driven. Upon the auger-shaft $z'$ and within the casing 85 is mounted the cleaner mechanism for the tailings, as will next be described. A plate 86, having a hub fixed to the shaft $z'$, has secured to its inner face a plurality of blades 87, the broader portions of these blades 87 extending into the expanded peripheral portion of the casing 85. The narrow portion of the blades 87 extend within the contracted part of the casing 85, and opposite the narrow parts of the blades 87 the casing has fixed thereto the short blades 88, that are secured to the casing at an angle to said blades 87, as will be seen by reference to Fig. 7 of the drawings. From the bottom of the casing 85 a spout 89 leads to a trough 90, that extends above the conveyer K, as shown in Fig. 3. This trough 90 has a slot in its bottom, through which the tailings will pass onto the conveyer K. Hence it will be seen that the tailings issuing from the auger-trough $z$ will be thoroughly agitated, and lumps of dirt, &c., will be broken up before the tailings are returned by the spout to the conveyer K. The employment of a cleaner mechanism for the tailings, whereby lumps of dirt, chaff sticking to the grain, &c., will be agitated and broken up, will be found of a special advantage. So, also, the feature of cleaning the grain above the straw is a feature of importance and, in connection with the upper and lower straw-racks and fan for delivering the blast of air through the straw as it falls from the upper rack to the lower one, is distinctly characteristic of this invention.

Having thus described my invention, what I claim as new, and desire to secure by Letters Patent, is—

1. In a threshing-machine, a beater comprising a revoluble casing provided with a series of bars extending lengthwise thereof and having inwardly-curved plates extending lengthwise of the beater between said bars, said bars being formed with openings therethrough, and a series of beater-fingers projecting through said bars and a crank-shaft within the casing of said beater whereon said beater-fingers are revolubly mounted.

2. In a threshing-machine, the combination of a threshing-cylinder, its concave, means located in the forward and upper portion of the machine for moving the straw upwardly and rearwardly from the concave, a straw rack or carrier extending along the lower part of the machine, means for delivering an air-blast to the straw as it falls from the rear end of the upper straw-moving mechanism to the front end of the lower straw-moving mechanism, means for collecting the grain beneath the lower straw-moving mechanism, grain-cleaning mechanism located above the rear end of the lower straw-moving mechanism and means for conveying the grain from beneath the lower straw-moving mechanism to the elevated grain-cleaning mechanism.

3. In a threshing-machine, the combination of a threshing-cylinder, its concave, means for moving the straw rearwardly along the upper portion of the machine from said concave, a straw rack or carrier extending along the lower and rear part of the machine, means for delivering an air-blast to the straw as it falls to the front end of the lower straw rack or carrier, a shield extending downwardly from the upper part of the machine opposite the air-blast passage, grain-cleaning mechanism located at the rear of said shield and above the rear end of the lower straw rack or carrier, means for collecting the grain beneath said straw rack or carrier and means for conveying the grain from beneath said lower straw rack or carrier to said elevated cleaning mechanism at the rear of the machine.

4. A threshing-machine comprising a threshing-cylinder and its concave, a grain-receiving pan or conveyer beneath said concave, an auger-casing into which said pan or conveyer discharges, a short straw rack or carrier arranged in the upper part of the machine, an inclined grain-receiving pan or conveyer located beneath said straw rack or carrier and arranged to discharge onto the pan or conveyer beneath the concave, a lower straw rack or carrier arranged along the lower part of the rear of the machine, a grain-conveyer extending beneath said lower straw rack or carrier and arranged to discharge into said auger-casing and means for delivering an air-blast to the straw as it passes from the upper to the lower straw rack or carrier.

5. A threshing-machine comprising a threshing-cylinder, its concave, a beater and its grate at the rear of said cylinder, a short straw rack or carrier arranged adjacent the beater-grate and in position to receive the straw as it passes therefrom, a grain-receiving pan or plate beneath said straw rack or carrier, a fan-casing and fan arranged below said straw rack or carrier and a second straw rack or carrier extending along the rear portion of the machine adjacent its bottom and a conveyer extending beneath said lower straw rack or carrier.

6. A threshing-machine comprising in combination a threshing-cylinder, its concave, means located in the forward and upper portion of the machine for moving the straw rearwardly and upwardly from the concave, a straw rack or carrier extending along the lower part of the machine, means for delivering an air-blast to the straw as it falls from the rear end of the upper straw-moving mechanism to the front end of the lower straw-moving mechanism, a grain-auger casing located in the rear part of the machine above the lower straw rack or carrier, means for elevating the grain, &c., first separated from the straw from below the lower straw rack or carrier to the upper grain-auger casing, a drum or casing arranged to receive the grain from the upper end of said elevating means and extending transversely of the upper part of the machine and provided with an opening through which the grain will be discharged, a shoe located below and at the rear of said drum or casing and provided with one or more sieves, an air-blast pipe arranged at the front of said shoe and serving to deliver a blast of air through the grain as it falls from said drum or casing, a receptacle below said air-blast pipe for the cleaned grain, and a second receptacle adjacent the lower end of the shoe-bottom to receive the material from the shoe.

7. A threshing-machine comprising in combination a threshing-cylinder, its concave, means located in the forward and upper portion of the machine for moving the straw rearwardly and upwardly from the concave, a straw rack or carrier extending along the lower part of the machine, means for delivering an air-blast to the straw as it falls from the rear end of the upper straw-moving mechanism to the front end of the lower straw-moving mechanism, a grain-auger casing wherein the grain, &c., first separated from the straw, is received, an elevator connected with said auger-casing, a drum or casing arranged to receive the grain from the upper end of said elevator and extending transversely of the upper part of the machine above the lower straw-moving mechanism, said drum or casing being provided with an opening through which the grain will be discharged, means for delivering a blast of air through the grain as it falls from said drum or casing, a shoe arranged below and at the rear of said drum or casing and provided with a sieve in its upper portion, and with a receptacle at its rear end to catch the material passing from said sieve, and mechanism whereby the material from said receptacle is returned to the drum or casing to be again subjected to the air-blast.

8. A threshing-machine comprising the combination with the grain-auger casing wherein the grain, &c., first separated from the straw, is received, of an elevator connected with said auger-casing, a drum or casing arranged to receive the grain from the upper end of said elevator, and extending transversely of the upper part of the machine at its rear, and provided with an opening through which the grain will be discharged, means for delivering a blast of air through the grain as it falls from said drum or casing, means for receiving and conveying away the cleaned grain, a shoe extending rearwardly from beneath said drum or casing, and provided at its upper portion with a sieve and at its rear end with a receptacle for the material passing from said sieve, and a cleaner or agitator connected with said receptacle and comprising an expanded casing having revoluble blades therein, and a spout leading from said expanded casing and serving to conduct the material back to the conveyer of the machine.

9. A threshing-machine comprising the combination with the grain-auger casing wherein the grain, &c., first separated from the straw is received, of an elevator connected with said auger-casing, a drum or casing arranged to receive the grain from the upper end of said elevator and extending transversely of the upper part of the machine and provided with an opening through which the grain will be discharged, a shoe arranged at the rear of said drum or casing and provided at its upper portion with a sieve and at its rear with a rack or grating and with a receptacle for the material passing off said sieve, said shoe being provided with a downwardly and forwardly inclined bottom, a receptacle to catch the material passing down said bottom, an air-blast pipe arranged below and in front of the discharge-opening of said drum or casing and a receptacle in front of said shoe to receive the clean grain falling from said casing.

10. A threshing-machine comprising a threshing-cylinder, its concave, means for moving the straw rearwardly from said concave for a short distance along the upper part of the machine, a straw rack or carrier located along the lower part of the machine and extending to the rear thereof, an air-blast pipe located at the front of said lower straw-carrier, suitable means for collecting the grain separated from the straw during its passage in the upper, rear part of the machine above said lowermost straw-carrier, conveyer mechanism for raising the grain to said drum or casing, means for delivering an air-blast to the grain as it falls from said drum or casing and a receptacle for catching the grain as it falls from said drum or casing.

11. A threshing-machine comprising a combination of a threshing-cylinder and concave, means located at the rear of the concave and in the upper, front portion of the machine for conducting the straw from the concave, a deflecting plate or shield located about centrally of the machine and extending across the same from the top toward the bottom, a blast-fan located in front of said shield and arranged to force a blast of air through the straw as it falls from the upper straw-moving mechanism, a straw-carrier located in the bottom and rear portion of the machine below said plate or shield for conveying the straw rearwardly from the machine, a grain-auger casing wherein the grain first separated from the straw is received, an elevator leading upwardly and rearwardly from said grain-auger casing, a drum or casing arranged in the upper, rear portion of the machine behind said plate or shield to receive the grain from the upper end of said elevator and extending transversely of the machine and provided with an opening through which the grain will be discharged, a shoe arranged at the rear of and beneath said drum or casing, means for delivering a blast of air through the grain as it falls from said grain-auger casing and separate receptacles for receiving the clean grain and material from said shoe.

12. A threshing-machine comprising the combination with the grain-auger casing, of elevators leading upwardly from the ends of said auger-casing, a drum or casing arranged in the upper part of the machine to receive the grain from said elevators and extending transversely of the machine, the lower part of said drum or casing being provided with an opening of variable width through which the grain will be discharged, reversely-arranged augers for distributing the elevated grain along said drum or casing, means for delivering a blast of air through the grain as it falls from said drum or casing and means for receiving and conveying away the cleaned grain.

BRYON G. BAKER.

Witnesses:
JAMES O. ARMS,
DAISY WALLACE.